(12) United States Patent
Todd et al.

(10) Patent No.: US 9,852,138 B2
(45) Date of Patent: Dec. 26, 2017

(54) CONTENT FABRIC FOR A DISTRIBUTED FILE SYSTEM

(71) Applicant: EMC Corporation, Hopkinton, MA (US)

(72) Inventors: Stephen Todd, Shrewsbury, MA (US); Jeroen Van Rotterdam, Berkeley, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 272 days.

(21) Appl. No.: 14/320,001

(22) Filed: Jun. 30, 2014

(65) Prior Publication Data
US 2015/0379026 A1   Dec. 31, 2015

(51) Int. Cl.
G06F 17/30   (2006.01)
(52) U.S. Cl.
CPC .. G06F 17/30082 (2013.01); G06F 17/30085 (2013.01)
(58) Field of Classification Search
CPC ......... G06F 17/30085; G06F 17/30082; G06F 17/30083; G06F 17/30084; G06F 17/30221; G06F 17/30306
USPC .................................. 707/694, 634
See application file for complete search history.

(56) References Cited

U.S. PATENT DOCUMENTS

| 7,512,944 | B2 | 3/2009 | Schneider |
| 7,590,623 | B2 | 9/2009 | Fellenstein |
| 7,661,089 | B2 | 2/2010 | Cope |
| 7,810,090 | B2 | 10/2010 | Gebhart |
| 8,051,158 | B2 | 11/2011 | Kojima |
| 8,700,611 | B2 | 4/2014 | Kelshikar |
| 9,218,276 | B2 | 12/2015 | Oe |
| 2002/0095671 | A1 | 7/2002 | Delo |
| 2003/0033448 | A1 | 2/2003 | Kieffer |
| 2005/0097145 | A1 | 5/2005 | Benhase |
| 2005/0138618 | A1 | 6/2005 | Gebhart |
| 2006/0015865 | A1 | 1/2006 | Schneider |
| 2006/0149714 | A1 | 7/2006 | Fellenstein |
| 2006/0294515 | A1 | 12/2006 | Gimpl |
| 2008/0244057 | A1 | 10/2008 | Kojima |
| 2008/0320483 | A1 | 12/2008 | Hou |
| 2009/0313229 | A1 | 12/2009 | Fellenstein |
| 2012/0144219 | A1 | 6/2012 | Salahshour |
| 2013/0219144 | A1 | 8/2013 | Oe |
| 2013/0339298 | A1* | 12/2013 | Muller et al. ................. 707/640 |
| 2014/0007097 | A1 | 1/2014 | Chin |
| 2014/0047201 | A1 | 2/2014 | Mehta |
| 2014/0089579 | A1 | 3/2014 | Kurokawa |
| 2014/0188825 | A1* | 7/2014 | Muthukkaruppan et al. ............................ 707/694 |
| 2014/0359044 | A1 | 12/2014 | Davis |

(Continued)

OTHER PUBLICATIONS

Shvachko et al., The Hadoop Distributed File Sytem, 2010, IEEE, 1-10.*

(Continued)

Primary Examiner — Jean B Fleurantin
(74) Attorney, Agent, or Firm — Peter Jovanovic; Theodore A. Chen; Krishnendu Gupta

(57) ABSTRACT

A method, article of manufacture, and apparatus for providing content services on a distributed file system is discussed. These services may be applied to files, data blocks, and/or metadata. A content fabric that resides within or sits along side the distributed file system may apply the services.

6 Claims, 5 Drawing Sheets

(56) References Cited

U.S. PATENT DOCUMENTS

2015/0128139 A1    5/2015  Suzuki
2015/0295800 A1   10/2015  Bala
2015/0371031 A1   12/2015  Ueno
2015/0381550 A1*  12/2015  Mohammed et al. ........ 709/206

OTHER PUBLICATIONS

Rencuzogullari et al., Dynamic Adaptation to Available Resources for Parallel Computing in an Automous Network of Workstations, published by ACM, 2001, pp. 72-81.

* cited by examiner

CONTENT FABRIC FOR A DISTRIBUTED FILE SYSTEM

CROSS REFERENCE TO RELATED APPLICATIONS

This Application is related to U.S. patent application Ser. No. 14/320,069 entitled "DYNAMICALLY COMPOSED COMPUTE NODES COMPRISING DISAGGREGATED COMPONENTS" Ser. No. 14/318,805 entitled "APPLICATION AND INFORMATION MOVEMENT IN A CLOUD ENVIRONMENT" Ser. No. 14/318,831 entitled "CLOUDBOOK", and Ser. No. 14/319,773 entitled "MIGRATING PRIVATE INFRASTRUCTURE SERVICES TO A CLOUD", filed on even date herewith, which are hereby incorporated herein by reference in their entirety.

FIELD OF THE INVENTION

This invention relates generally to distributed file systems, and more particularly to systems and methods for providing content services on distributed file systems.

BACKGROUND OF THE INVENTION

Data centers and cloud infrastructures are starting to deploy "Data Lake" architectures that are predominately based on distributed file systems. One example of a distributed file system is the Hadoop Distributed File System ("HDFS"). Distributed file systems are often highly scalable, can operate on low cost hardware, and support analytic algorithms. They lack, however, the content services found on more traditional systems.

There is a need, therefore, for a system, method, and process for providing content services on distributed file systems.

SUMMARY OF THE INVENTION

A method, system, and program product for providing content management services on a distributed file system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
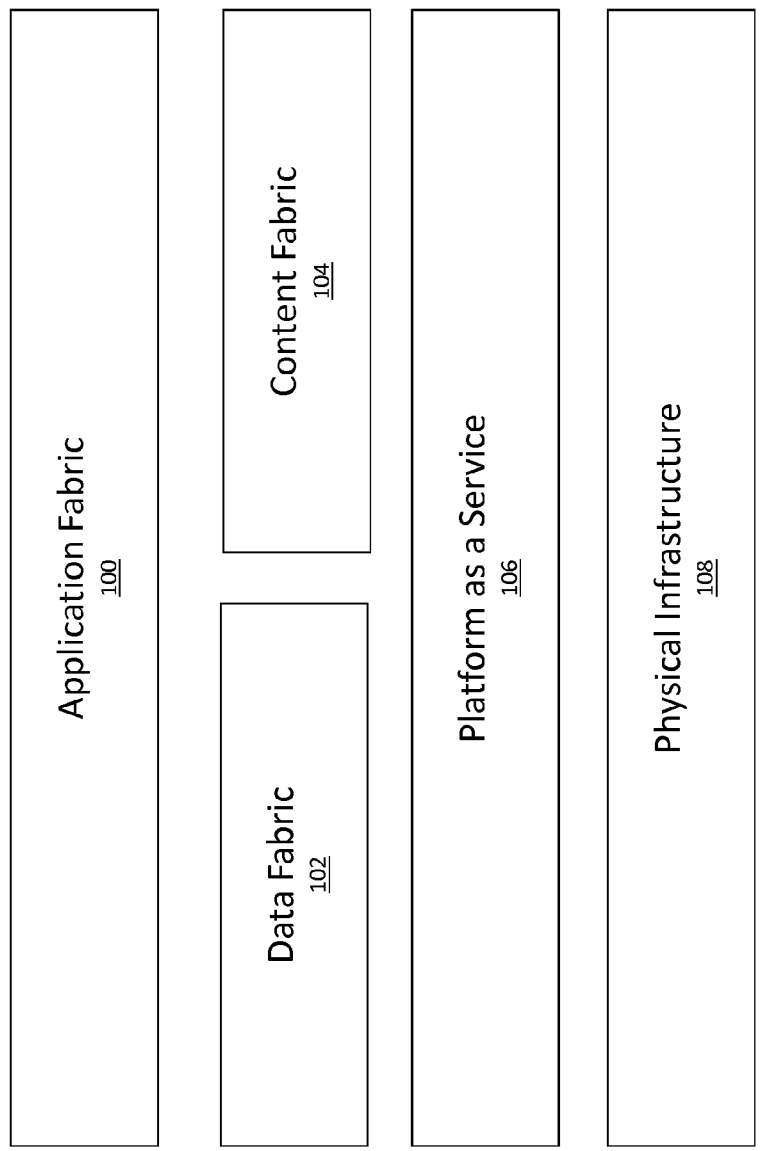
FIG. 1 depicts a solution stack consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure describes systems and methods for providing a content fabric in an environment comprising a distributed file system, such as a Hadoop file system ("HDFS"). This content fabric may apply or enforce policies, such as governance or compliance functionality, to binary objects, files, or other data stored on the file system. In an embodiment, the content fabric may reside in the application stack and apply these policies to files and/or data blocks synchronously and/or asynchronously. The policies may be based on the file itself and/or file metadata, and may therefore be dynamically applied as the files arrive. The policies thereby provide data services not traditionally offered on distributed file systems.

FIG. 1 depicts a solution stack consistent with an embodiment of the present disclosure. The solution stack may include application fabric 100, data fabric 102, and content fabric 104 all operating on platform as a service ("PaaS") layer 106. PaaS layer 106 may in turn operate on physical infrastructure 108, which may include one or more physical machines comprising processors, storage, and/or memory.

In an embodiment, application fabric 100 may include applications writing to or reading from a virtual infrastructure embodied in PaaS 106. This virtual infrastructure may be accessed via data fabric 102, which may include a distributed file system, such as HDFS. In some embodiments data fabric 102 comprises data analytic tools for ingesting data into, querying, and exporting data from the distributed file system. These tools may include querying interfaces, such as Pivotal HD, SQL-to-HDFS conversion interfaces, such as Pivotal HAWQ, in-memory data grid analytics, such as Pivotal GemFire, or unstructured schema recognition tools, such as Pivotal Analytics.

Content fabric 104 may comprise content services that are not traditionally available to the distributed file system. These content services may include policies or other logic that is executed in response to a given file, file type, and/or content. For example, the content service may be a content transformation service which transforms one file format to another (e.g. bmp to jpeg). Different content services are discussed in detail below.

Distributed files systems, such as HDFS, may process files prior to writing them to physical or virtual storage. For example, the distributed file system may break a file into blocks and store those blocks at different locations in the distributed system. As a result, content fabric 104 may apply content services to both the files themselves, and to the constituent blocks stored on the system. For example, at the file level a policy may determine a video file should be transformed from and AVI format to a MPEG format. Similarly, at the block level a policy may determine that the blocks should be stored in a specific geographical location because they contain sensitive information. Content fabric 104 may make these determinations and apply the appropriate policies to either the file itself or the file's constituent blocks.

In some embodiments, content fabric 104 may be incorporated directly into the distributed file system. For example, an instance of HDFS may be modified to include the content fabric. Additionally or alternatively, the content fabric may be implemented in a separate module in communication with the distributed file system.

Figure 2:
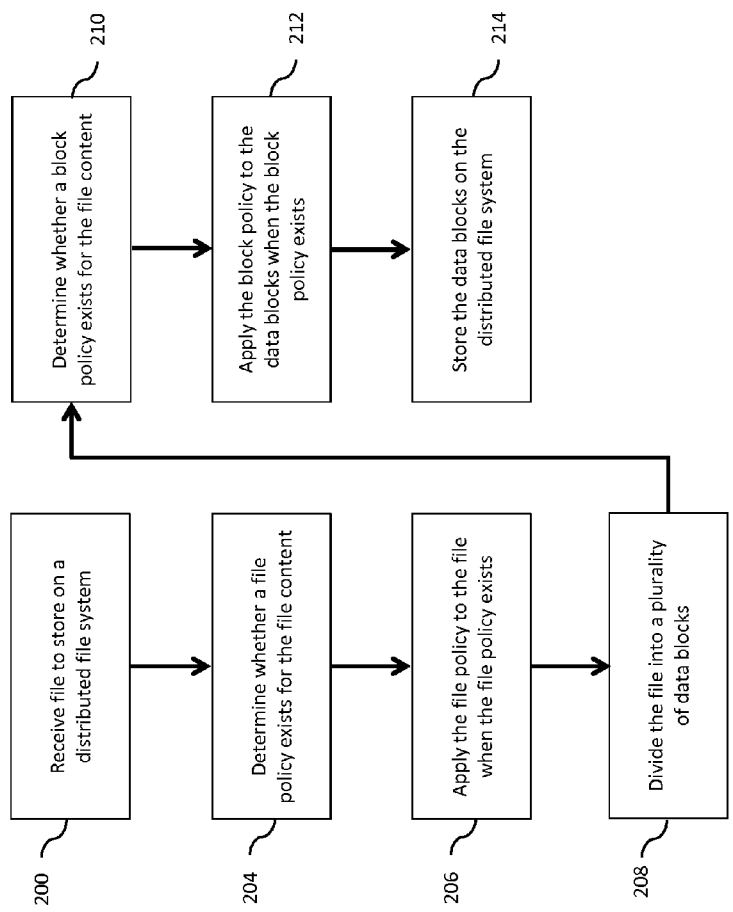
FIG. 2 depicts a process for providing content services consistent with an embodiment of the present disclosure.

Turning now to FIG. 2, a method for processing a file using a content fabric is discussed. This method could be used, for example, to provide content services on top, along side or embedded in the distributed file system.

At block 200, a file to be stored on the distributed file system is received. This file could be received, for example, from application fabric 100. In some embodiments, the file is transmitted to the data fabric and intercepted by the content fabric. Any method of ingesting the file into the content fabric is consistent with the present disclosure.

At block 204, the content fabric may determine whether a policy exists and should be applied to the file. This policy could be, for example, based on the file content itself. Additionally or alternatively, the policy may be based on the file type, format, metadata, or any other information associated with the file. The following are example policies, logic, and/or content services that may be applied to the file.

Replication Factor Policies.

Some distributed file systems, such as HDFS, use data replication and redundancy to protect against data loss. Once files are divided into blocks, each block may be stored multiple times at different locations. For example, a block may be stored on two drives in the same datacenter. If the one drive datacenter is destroyed or unavailable, the data block still exists in on the second drive. The number of redundant copies of the data block is called the replication factor. In some embodiments, the content fabric may dynamically change the replication factor for a file based on the file content. Files containing important content may receive a higher replication factor that files containing less important content. Replication factor policies may be particularly beneficial when applying policies to data blocks or file partitions, as discussed in detail below.

Retention Management Policies.

The content may apply a retention management policy to the file. For example, the retention management policy may determine that the file is subject to a legal hold and should never be deleted. This could be determined from the file's content or metadata, such as the file author/creator. If any update and/or delete instructions are received for the file, they may be disregarded and superseded by the retention policy.

Access Control Policies.

The content fabric may provide a variety of access control policies. For example, the content fabric may provide context aware access control policies. A file may be stored or accessed differently based on the file or access request's origin, device type, operating system, active security applications, etc. Additionally or alternatively, these access control policies may dynamically grant users or groups varying permissions to the file based on the file content. For example, a legal department group may dynamically receive read/write access to a contract document. Any other type of access control, such as role based access control, access control lists, risk adaptive access control, or attribute based access control, is consistent with embodiments of the present disclosure.

Geographical Partitioning.

Geographical partitioning policies may be applied when a file needs to be stored within certain geographical boundaries or at a particular location. For example, a file may contain personally identifiable information originating from Europe. European law may dictate that all such files be stored either in Europe, or in a country that meets European privacy standards. The geographical partitioning policy may dynamically route the file to a storage infrastructure satisfying these requirements. This policy may be particularly beneficial when processing file partitions and blocks, as discussed in detail below.

Content Transformation Policies.

The content fabric may also apply content transformation service ("CTS") policies. These policies may convert the content from one format to another. For example, an AVI file may be converted to an MPEG format. In some embodiments, the content transformation process occurs asynchronously, as discussed in detail below.

Metadata Extraction Policies.

The content fabric may process the file to extract metadata, which may then be stored in the distributed file system's native metadata structures. For example, HDFS contains a unique, enhanced metadata registry. Metadata may be extracted from the file and stored in this registry. For example, close captioning may be extracted from a video file and stored in the metadata registry. In some embodiments, metadata extraction is an asynchronous process, as discussed below.

Version Control Policies.

The content fabric may also implement and apply versioning policies to the file. The first received copy of the file may be the initial version. The next time an application attempts to update the file, the received changes may be stored as a second version. In an embodiment, the changes are applied to a new copy of the file. Alternatively, only the delta (i.e. the received changes) may be saved to the distributed file system.

Metadata Composition Policies.

The content fabric may add new metadata traits to a metadata registry. These traits may be extracted from the file itself, or they may be determined by the metadata composition policy. For example, the content fabric may scan a document and determine it is a legal document. The content fabric may then set a metadata attribute associated with the file marking it as a legal document. These traits may be added, updated, or deleted from the registry dynamically, and such behaviors may be determined by the policy. In some embodiments, these metadata traits may be used to maintain chain-of-custody or route workflow activities. As different steps in a workflow are performed, associated metadata traits may be created, deleted, or updated appropriately.

In some embodiments, multiple policies may be grouped together to form a workflow. For example, a metadata composition policy may be applied to dynamically associate a file with a metadata trait (e.g. marking the file as a legal document). Based on this trait, an access control policy may be applied to grant appropriate permissions to a given group (e.g. the legal department). Depending on the group that receives permissions, different geographical partitioning policies may be enforced (e.g. legal documents are only stored in high-security datacenters). Any of the policies may be mixed and used in conjunction with other polices.

Returning to FIG. 2, at block 206 any identified file level policies may be applied to the file. For example, the content fabric could apply a CTS policy to a file. This application may occur synchronously, meaning before the file is saved, or asynchronously, meaning after or along side the save process. Synchronous and asynchronous policy applications are discussed in detail below.

At block 208, the file may be divided into a plurality of data blocks. In some embodiments, the number of blocks may be determined by a policy applied by the content fabric. Alternatively, the distributed file system's native logic may handle the division.

At block 210, the content fabric may search for relevant block level policies. Unlike file policies, which are applied to the file itself as a whole, block policies may be applied to individual data blocks. For example, the individual blocks may be stored at different geographical locations based on a geographical partitioning policy. Additionally or alternatively, different blocks may receive different replication factors based on the associated file's content.

At block 212, any identified block level policies may be applied to the blocks, and those blocks may be processed in accordance with the policies.

Finally, at block 214, the file blocks may be stored on the distributed file system.

Figure 3:
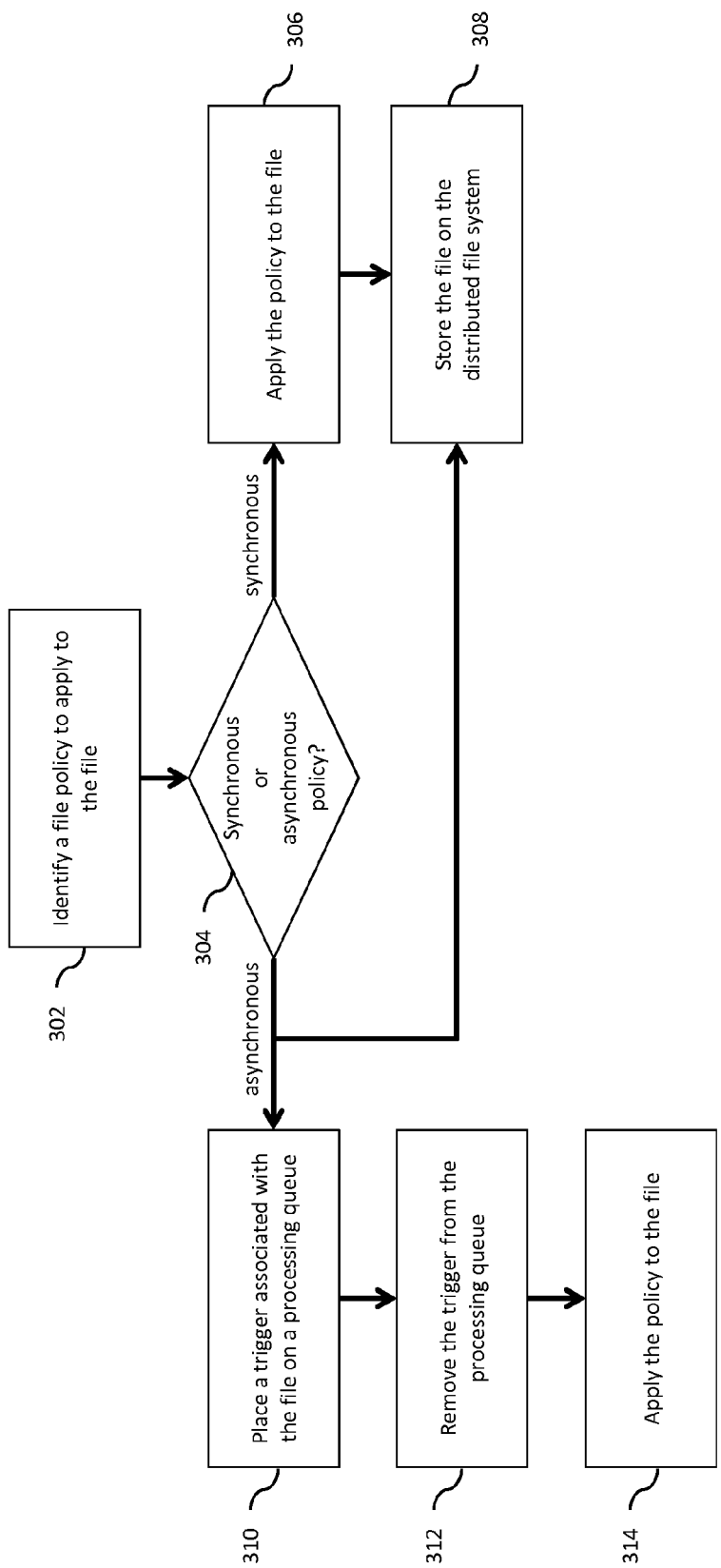
FIG. 3 depicts a flowchart for synchronously and asynchronously applying file policies consistent with an embodiment of the present disclosure.

Turning now to FIG. 3, a process for asynchronously and/or synchronously applying one or more file policies is discussed. At block 302, a file policy may be identified. In an embodiment, this is substantially similar to block 204 discussed above.

At 304, the content fabric may determine whether to apply the policy synchronously and/or asynchronously. If the policy is synchronous, it may be applied before the file is stored to the distributed file system. If the policy is asynchronous, it may be applied after or while the file is being saved to the distributed file system. In some embodiments, synchronous policies may be particularly important policies and impact where/how the file is saved. For example, geographical partitioning policies may be synchronous. Asynchronous policies may be less critical, or may have large processing requirements. For example, CTS of large video files may be asynchronous because those services may consume large resources and take a long time to complete. Similarly, metadata extraction may be asynchronous.

While multiple examples of synchronous and asynchronous policies are provided, it should be appreciated that any policy may be applied synchronously or asynchronously. Similarly, the processing type may dynamically change. A policy may be applied synchronously to one file and asynchronously to another. This dynamic application may itself be based on a policy, which could consider file type, content, size, etc.

If 304 determines the policy is synchronous, the policy may be applied to the file at block 306 prior to storing the file on the distributed file system at block 308. Storing the file to the system may involve breaking the file into data blocks for further processing, as discussed throughout this specification.

If 304 determines the policy is asynchronous, the file may be immediately stored to the distributed file system at 308 and a trigger associated with the file may be placed on a processing queue at 310. In some embodiments, the trigger may comprise a pointer to the file and a description or identifier for the identified policy.

At block 312, the trigger may be removed from the processing queue. In some embodiments, the processing queue comprises multiple triggers for different files and policies. The files may be processed one at a time in a FIFO manner, in accordance with the policy defined in the trigger. This may allow processor heavy operations, such as CTS, to be performed in a controlled manner.

Finally, at block 314, the file may be read from the distributed file system and the policy may be applied. If the asynchronous policy is one step in a workflow, other policies may be applied. The other policies may be applied immediately, or a new trigger may be placed on a queue and the policies may be applied at a later time.

Figure 4:
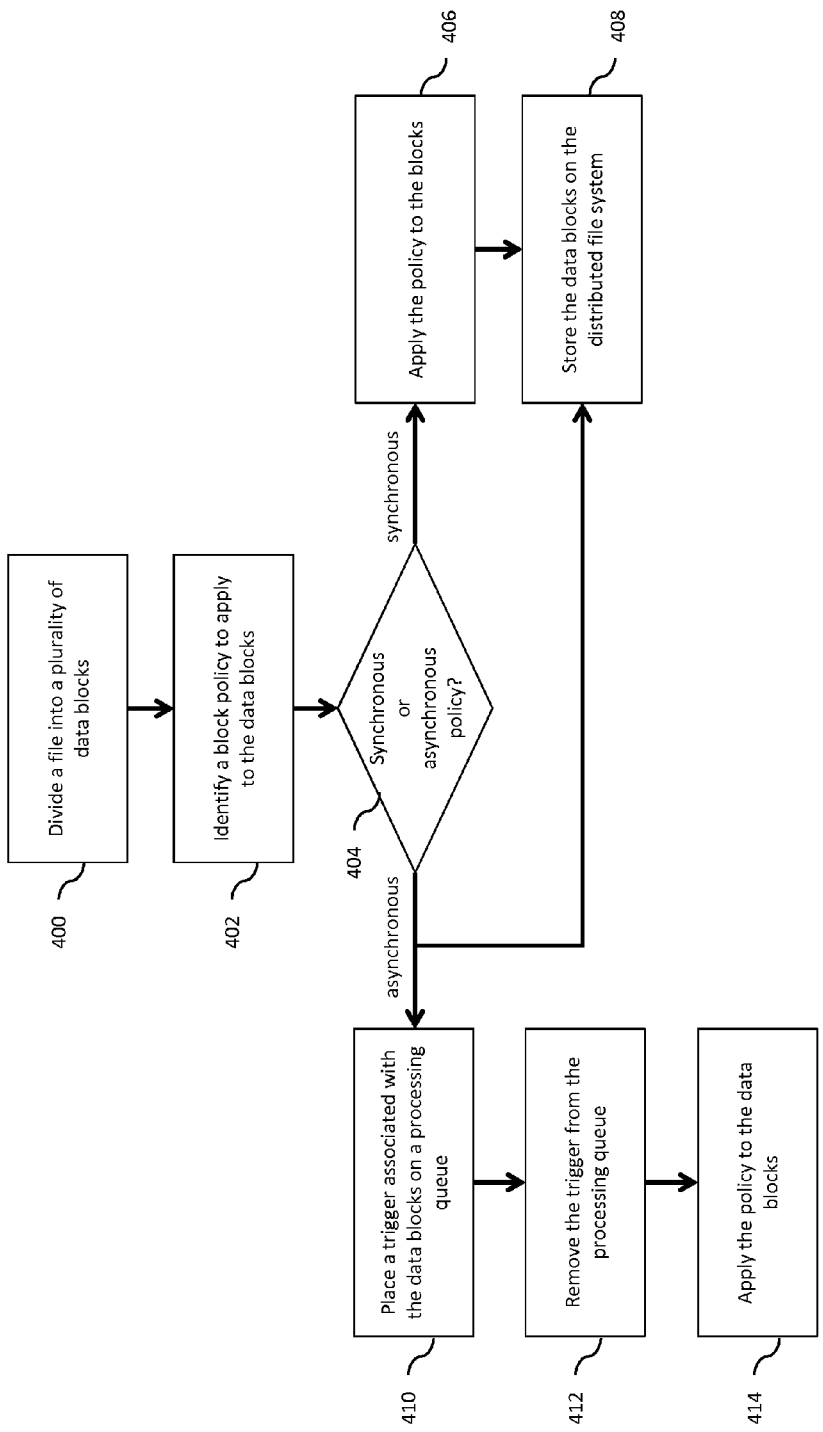
FIG. 4 depicts a flowchart for synchronously and asynchronously applying block policies consistent with an embodiment of the present disclosure.

Turning now to FIG. 4, a process for synchronously and/or asynchronously applying a policy to data blocks is discussed. At 400, a file may be divided into a plurality of data blocks and a block policy may be identified. This process may be substantially similar to blocks 208 and 210, discussed in reference to FIG. 2.

At 404, the content fabric may determine whether to apply the policy synchronously or asynchronously. If the policy is to be applied synchronously, it may be applied at block 406 and the data blocks may be stored at 408.

If the policy is asynchronous, a trigger may be placed on a processing queue at 410 and the blocks may be stored on the distributed file system at 408. In some embodiments, the processing queue is the same queue used for asynchronous file processing. Alternatively, it may be a different, block-specific queue. The trigger may include a pointer to a specific block, or may point to all of the constituent blocks of a given file.

At 412, a trigger is removed from the processing queue and the associated block is processed in accordance with the policy at 414.

Synchronous/asynchronous block processing may be substantially similar to file processing, and the discussed techniques for file processing may also be applied to block processing.

Figure 5:
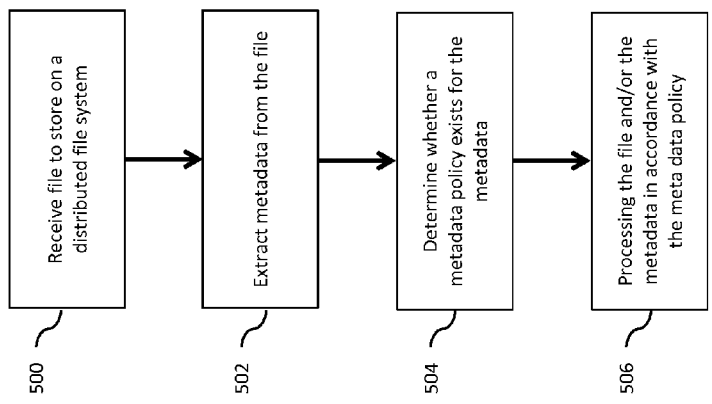
FIG. 5 depicts a flowchart for applying metadata policies consistent with an embodiment of the present disclosure.

Policies may also be applied to files and blocks based on metadata. For example, a given file may include a metadata attribute identifying an owner or author. If the content fabric determines that the owner or author is important, a particular policy may be applied. FIG. 5 depicts a process for applying metadata policies to files stored on a distributed file system.

At 500, the content fabric may receive or intercept a file to be saved on a distributed file system.

At 502, metadata may be extracted from the file. This metadata may be native to the file, such as attributes in a Microsoft Word document, or it may be extracted using any of the techniques discussed above, or it may be supplied to the system with the file. Once extracted, the metadata may be stored in the distributed file system's native metadata registry.

At block 504, the content may determine whether a metadata policy exists for the extracted metadata. These metadata policies may be substantially similar to the file and/or block policies. For example, an access control metadata policy may be associated with a given owner or author.

At 506, the file, block, and/or metadata may be processed in accordance with the policy. This may include synchronous and/or asynchronous policies.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for providing content management services on a distributed file system, the method comprising:
   receiving an object to store on the distributed file system;
   determining whether a content transformation policy exists for the object, wherein the content transformation policy converts the object from a first format to a second format;
   forming a workflow from the content transformation policy and a second object policy, wherein the second object policy is based on a result from the content transformation policy;
   applying the content transformation policy to the object;
   determining whether to apply the content transformation policy synchronously or asynchronously;
   placing an object trigger associated with the object on a processing queue when the content transformation policy is to be applied asynchronously;
   removing the object trigger from the queue and processing the object in accordance with the content transformation policy
   dividing the object into a plurality of data blocks;
   determining whether a block policy exists for the object;
   processing the object in accordance with the content transformation policy prior to storing the data blocks on the distributed file system when the content transformation policy is to be applied synchronously;
   applying the block policy when the block policy exists;
   determining whether to apply the block policy synchronously or asynchronously;
   placing a block trigger associated with the blocks on a queue when the block policy is to be applied asynchronously;
   removing the block trigger from the queue and processing at least one block in accordance with the block policy;
   applying the block policy to at least one block prior to storing the blocks on the distributed file system when the block policy is to be applied synchronously; and
   storing the data blocks in the distributed file system.

2. The method of claim 1, wherein at least one of the second object policy and the block policy is selected from a policy group comprising a retention management policy, an access control policy, a geo-partitioning policy, a content transformation policy, and a version control policy.

3. The method of claim 1, further comprising:
   extracting metadata from the object;
   determining a metadata policy for the metadata; and
   processing one of the object and the metadata in accordance with the metadata policy.

4. The method of claim 3, wherein extracting the metadata occurs asynchronously with storing the object.

5. A computer program product for providing content management services on a distributed file system, the computer program product comprising a non-transitory computer readable storage medium encoded with computer executable program, the code enabling:
   receiving an object to store on the distributed file system;
   determining whether a content transformation policy exists for the object, wherein the content transformation policy converts the object from a first format to a second format;
   forming a workflow from the content transformation policy and a second object policy, wherein the second object policy is based on a result from the content transformation policy;
   applying the content transformation policy to the object;
   determining whether to apply the content transformation policy synchronously or asynchronously;
   placing an object trigger associated with the object on a processing queue when the content transformation policy is to be applied asynchronously;
   removing the object trigger from the queue and processing the object in accordance with the content transformation policy
   dividing the object into a plurality of data blocks;
   determining whether a block policy exists for the object;
   processing the object in accordance with the content transformation policy prior to storing the data blocks on the distributed file system when the content transformation policy is to be applied synchronously;
   applying the block policy when the block policy exists;
   determining whether to apply the block policy synchronously or asynchronously;

placing a block trigger associated with the blocks on a queue when the block policy is to be applied asynchronously;
removing the block trigger from the queue and processing at least one block in accordance with the block policy;
applying the block policy to at least one block prior to storing the blocks on the distributed file system when the block policy is to be applied synchronously; and
storing the data blocks in the distributed file system.

6. A system for providing content management services on a distributed file system, the computer system comprising a computer processor configured to execute instructions comprising:
receiving an object to store on the distributed file system;
determining whether a content transformation policy exists for the object, wherein the content transformation policy converts the object from a first format to a second format;
forming a workflow from the content transformation policy and a second object policy, wherein the second object policy is based on a result from the content transformation policy;
applying the content transformation policy to the object;
determining whether to apply the content transformation policy synchronously or asynchronously;
placing an object trigger associated with the object on a processing queue when the content transformation policy is to be applied asynchronously;
removing the object trigger from the queue and processing the object in accordance with the content transformation policy
dividing the object into a plurality of data blocks;
determining whether a block policy exists for the object;
processing the object in accordance with the content transformation policy prior to storing the data blocks on the distributed file system when the content transformation policy is to be applied synchronously;
applying the block policy when the block policy exists;
determining whether to apply the block policy synchronously or asynchronously;
placing a block trigger associated with the blocks on a queue when the block policy is to be applied asynchronously;
removing the block trigger from the queue and processing at least one block in accordance with the block policy;
applying the block policy to at least one block prior to storing the blocks on the distributed file system when the block policy is to be applied synchronously; and
storing the data blocks in the distributed file system.

* * * * *